United States Patent [19]
Park et al.

[11] Patent Number: 5,913,233
[45] Date of Patent: Jun. 15, 1999

[54] APPARATUS FOR DRIVING A SEAT TEST MACHINE

[75] Inventors: Mal-sik Park; Yongho Choi; Yong-nam Ham, all of Kyonggi-Do, Rep. of Korea

[73] Assignee: SamSung Motors, Inc., Seoul, Rep. of Korea

[21] Appl. No.: 09/045,517

[22] Filed: Mar. 20, 1998

[30] Foreign Application Priority Data

Mar. 24, 1997 [KR] Rep. of Korea ....................... 97/10022
Mar. 24, 1997 [KR] Rep. of Korea ....................... 97/10026

[51] Int. Cl.⁶ ..................................................... G01N 3/56
[52] U.S. Cl. ........................................................... 73/7
[58] Field of Search ......................................... 73/7, 865.3

[56] References Cited

U.S. PATENT DOCUMENTS

| | | | |
|---|---|---|---|
| 2,815,135 | 12/1957 | Press ............................................. | 73/7 |
| 3,929,001 | 12/1975 | Lee et al. ...................................... | 73/7 |
| 4,936,135 | 6/1990 | Annis et al. ................................... | 73/7 |
| 5,703,303 | 12/1997 | Stewart ......................................... | 73/7 |

*Primary Examiner*—Robert Raevis
*Attorney, Agent, or Firm*—Howard S. Reiter; Steve S. Cha

[57] ABSTRACT

An apparatus for driving a seat testing machine that accurately tests the durability of the seat element, which includes a twisting assembly for providing both rubbing and impact engagements with the seat element, one common power source to activate a first mechanism to reciprocate the seat element along a first axis, and activate a second mechanism to reciprocate the twisting assembly about a rotary axis; and vertical loading and lifting mechanisms to repeatedly engage and disengage the twisting assembly from the seat element under a gravitational loading while simulating the varying weight of the occupant.

8 Claims, 7 Drawing Sheets

APPARATUS FOR DRIVING A SEAT TEST MACHINE

BACKGROUND OF THE INVENTION

1. Field of The Invention

The present invention relates to an apparatus for driving a seat test machine for an automobile that utilize one common power means to selectively reciprocate a seat element along a first axis, and to selectively oscillate a twisting member about a rotary axis. More particularly, the present invention includes mechanisms for repeatedly displacing the twisting member along said rotary axis to engage the seat element with a varying gravitational load in order to accurately measure the durability of the car seat.

2. Description of the Prior Art

Ordinarily, an automobile seat deteriorates over time due to its repeated use and the vehicle's vibration from an unevenly surfaced road. The outer skin of the seat can wrinkle and/or stretch, and the interior polyurethane foam can press down and lose its integrity from the cycling of forces applied by the occupant to various parts of the seat. Consequently, a continued wear on the seat can result in deformation and the seat can not function as it was intended.

Typically, a seat test machine uses an actual life-size seat and tests the durability of the seat's interior composition and exterior texture by applying repeated forces on various parts of the seat.

Early tests employed a human occupant. However, this method was limiting due to the extraordinary amount of time involved in observing and supervising. Such lengthy testing sequences not only resulted in inefficiency and unreliable results.

Efforts have been made to eliminate the problems of the earlier method. Among them, two well known approaches are: (1) disclosed in the Japanese Patent, No. 1-51767, "Test Machine for Interior of the Automobile Seat,"; and (2) Patent, No. 4-15893, "Automobile Seat Test Machine for Getting On and Off."

The Japanese Patent No. 1-51767, "Test Machine for Interior of the Automobile Seat" proposes a testing apparatus that uses a reclining seat which includes an operating leveler; a lifting spring mechanism combined with operating mean devices; an hinge coupled to a reclining mechanism; and a lifting spring mechanism controlled by an arm. A rotating arm positioned in the back of seat to resets the reclining seat and lifts the spring mechanism. Each controller is used individually to operate this test machine.

The Japanese Patent, "Automobile Seat Test Machine for Getting On and Off" contains a machine frame with the first movable member for moving in a forward-aft direction; the second movable member for moving in a lateral direction; the third movable element for moving in a vertical direction; a solid testing member for simulating an occupant who is seated and rising from the chair; a rotating drum attached to the solid testing member for applying a rubbing force to various directions against the seat. Furthermore, the machine contains a feature that recognizes road condition including slopes.

Although the first model eliminates the repeated testing of the reclining seat by providing automatic elements, it fails to test the durability and the shock consequence of the exterior texture and the interior polyurethane foam of the seat.

While the second model tests the exterior texture of the seat and its impact on the interior polyurethane foam, it requires assembling a real seat. Moreover, it fails to anticipate the varying weight of occupants. Thus, this testing produces less accuracy and reliability than a test machine equipped to handle variance in weight.

In addition, the second model requires multiple operating devices in order to operate numerous mechanisms involved in the invention, resulting an increase in production cost and as energy use.

Another well known invention is disclosed in U.S. Pat. No. 5,641,917, "Multi-axis Seat Durability Test Machine."

It proposes a multi-axis seat test machine containing: a seat mount and a loading element; a selectively actuable fore-aft displacement mechanism located between the loading element and the seat mount; a selectively acutable lateral displacement located between the loading frame and the seat mount; an engaging member simulating the shape of a human posterior; and, a loading element biasing the engaging member against the seat in a vertical direction with the vertical load.

However, the multi-axis seat test machine still requires the use of a life-size seat. It also requires several shafts to test the interior of the seat; moreover, the machines' complicated assembly produces the same disadvantage of high cost production and energy waste.

Accordingly, it is a goal of the present invention to provide an apparatus for driving a seat test machine for an automobile utilizing one common power means to reciprocate a seat element along a first axis and to oscillate a twisting member about a rotary axis. Moreover, the object of the present invention is to reduce the number of power-driving means in order to reduce production cost and energy use.

Another goal of the present invention is to accurately measure the durability of the car seat by providing mechanisms for repeatedly displacing the twisting member along said rotary axis into impact engagement with the seat element that has varying gravitational load and simulates the different loading condition of the occupant.

SUMMARY OF THE INVENTION

It is a principle object of the present invention to provide an apparatus for driving a seat test machine for an automobile, which includes a seat element, a twisting assembly having a testing head member for moving the testing head member vertically along the rotary direction to engage the surface of the seat element, a common power source to activate a first mechanism operable to reciprocate the seat element along a first axis and activate a second mechanism operable to oscillate the testing head member of the twisting assembly about the rotary axis, and vertical loading and lifting mechanisms selectively operable to displace the twisting assembly along the rotary axis so that the testing head member engage and disengage the seat element under a gravitational loading simulating the varying weight of the occupant.

The first mechanism and the second mechanism are powered by one common motor and equipped with a reduction gear for controlling the output generated by the motor.

The first mechanism includes a lower axial shaft that passes through the lower frame in a vertical direction and thereafter coupled to a center portion of a first rotating plate; a first sliding shaft coupled to a sliding plate for moving along the X-direction; and, a first crank shaft disposed between the first sliding shaft and the first rotating plate.

The one end of the first crank shaft is coupled to a third linking member at one end, which in turn is rotatably coupled to the first rotating plate. The other end of the first crank shaft is coupled to a forth linking member, which in turn is rotatably coupled to the first sliding shaft.

The second mechanism is coupled to the top portion of a second coupling means and further includes an upper axial shaft coupled to the second coupling means and extends through the upper frame in a vertical direction; a second sliding shaft is rotatably supported by a third guiding member and a forth guiding member for linear movement along the X-direction; a first rotary gear that is coupled to the upper end of the upper axial shaft in an axial direction and responding to the rotation of the upper axial shaft; a second rotary gear for constantly engaging with the first rotary gear; a fifth linking member disposed between the second rotary gear and the second crank shaft; a sixth linking member disposed between the second crank shaft and the second sliding shaft; and, a twisting assembly responding to the reciprocating movement of the second sliding shaft.

The twisting assembly further includes a twister shaft coupled to a center point of the testing head member in an axial direction at one end and extends through a first pinion at the other end; the second sliding shaft with a first toothed member that engages along the circumference of the first pinion for rotating the twister shaft in a twisting motion.

The vertical loading mechanism is coupled to the top portion of the twister shaft and includes a plurality of weights that permits the twister shaft to provide a gravitational impact load on the seat element in a substantially vertical direction; a first gear shaft having a second toothed member and a second gear shaft having a third toothed member coupled to the bottom of the vertical loading mechanism in a vertical direction and extending through the upper and middle frames in the downward direction; and, a fifth guiding member and a sixth guiding member positioned inside of the middle frame that allow passages for the first gear shaft and the second gear shaft, respectively. The middle frame includes a lifting mechanism for lifting the twister shaft out of an engagement with the seat element in a substantially vertical direction.

It is an object of the invention to provide the middle frame which includes a horizontal shaft; an electronic clutch coupled to one end of the horizontal shaft; a second motor coupled to the electronic clutch; and, a second and a third pinions coupled along the circumference of the horizontal shaft for engaging and disengaging the second toothed member and the third toothed member, respectively.

A BRIEF DESCRIPTION OF THE DRAWINGS

DETAILED DESCRIPTION OF THE PREFERRED EMBODIMENTS

Figure 1:
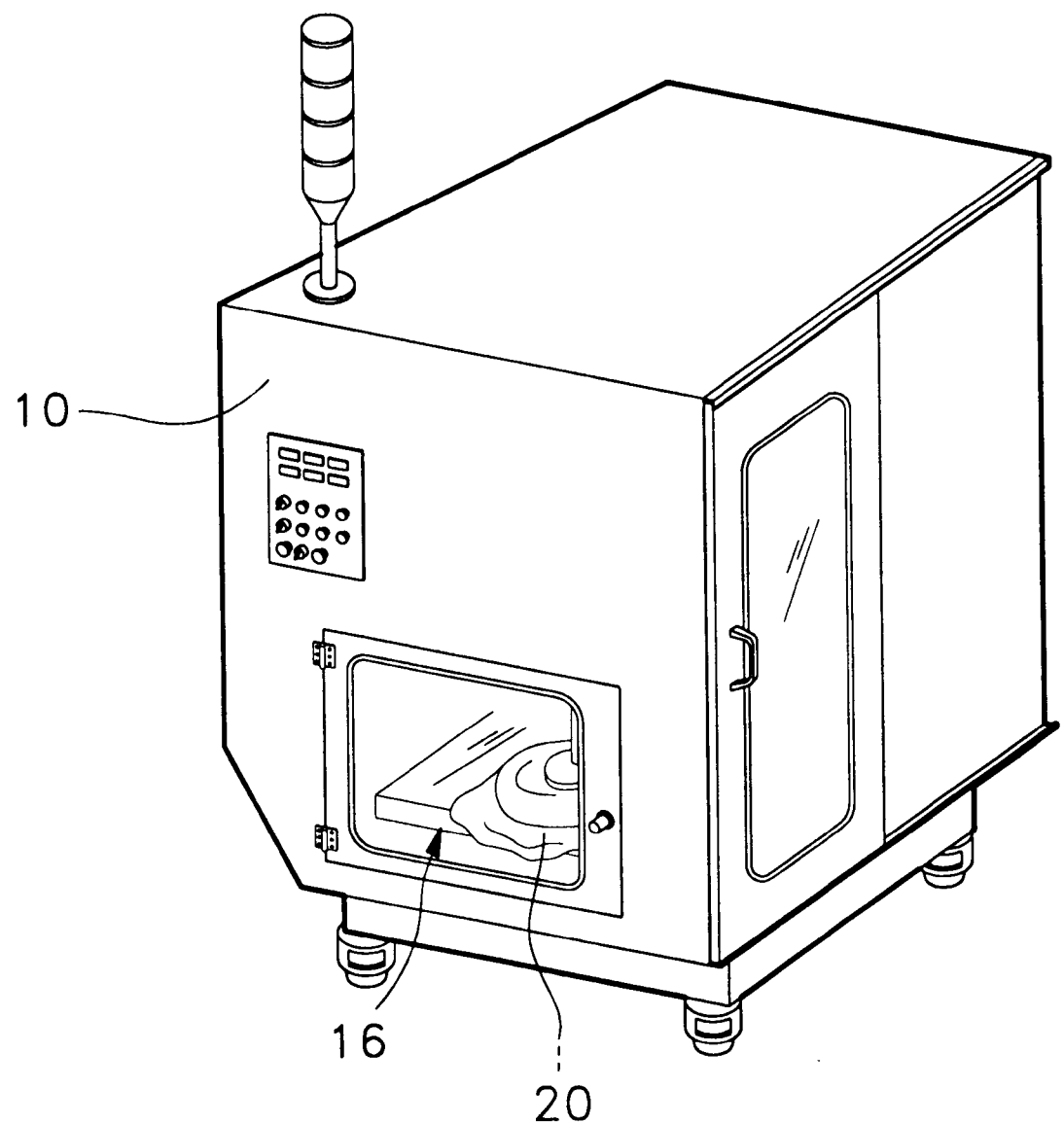
FIG. 1 illustrates a perspective view of the seat test machine according to an embodiment of the present invention.
Figure 2:
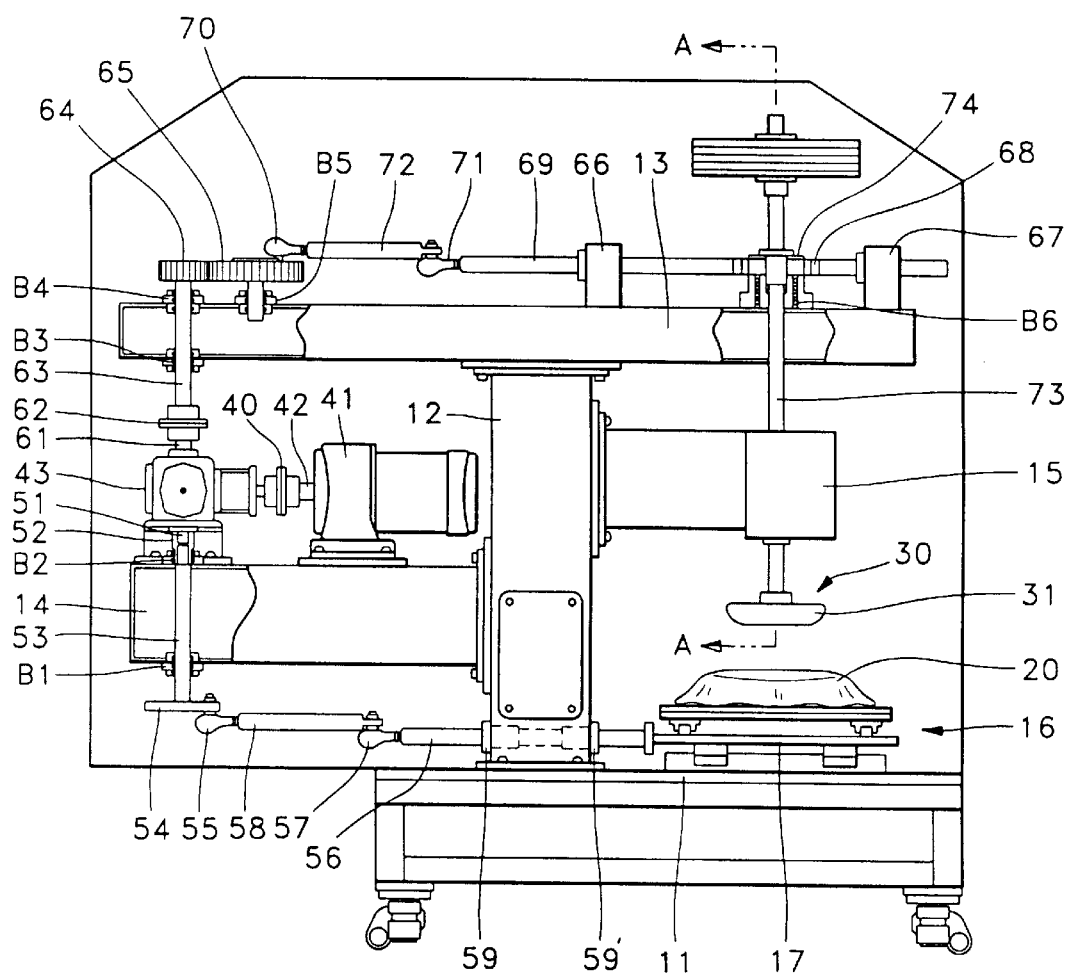
FIG. 2 illustrates a side view of the seat test machine according to an embodiment of the present invention.
Figure 3:
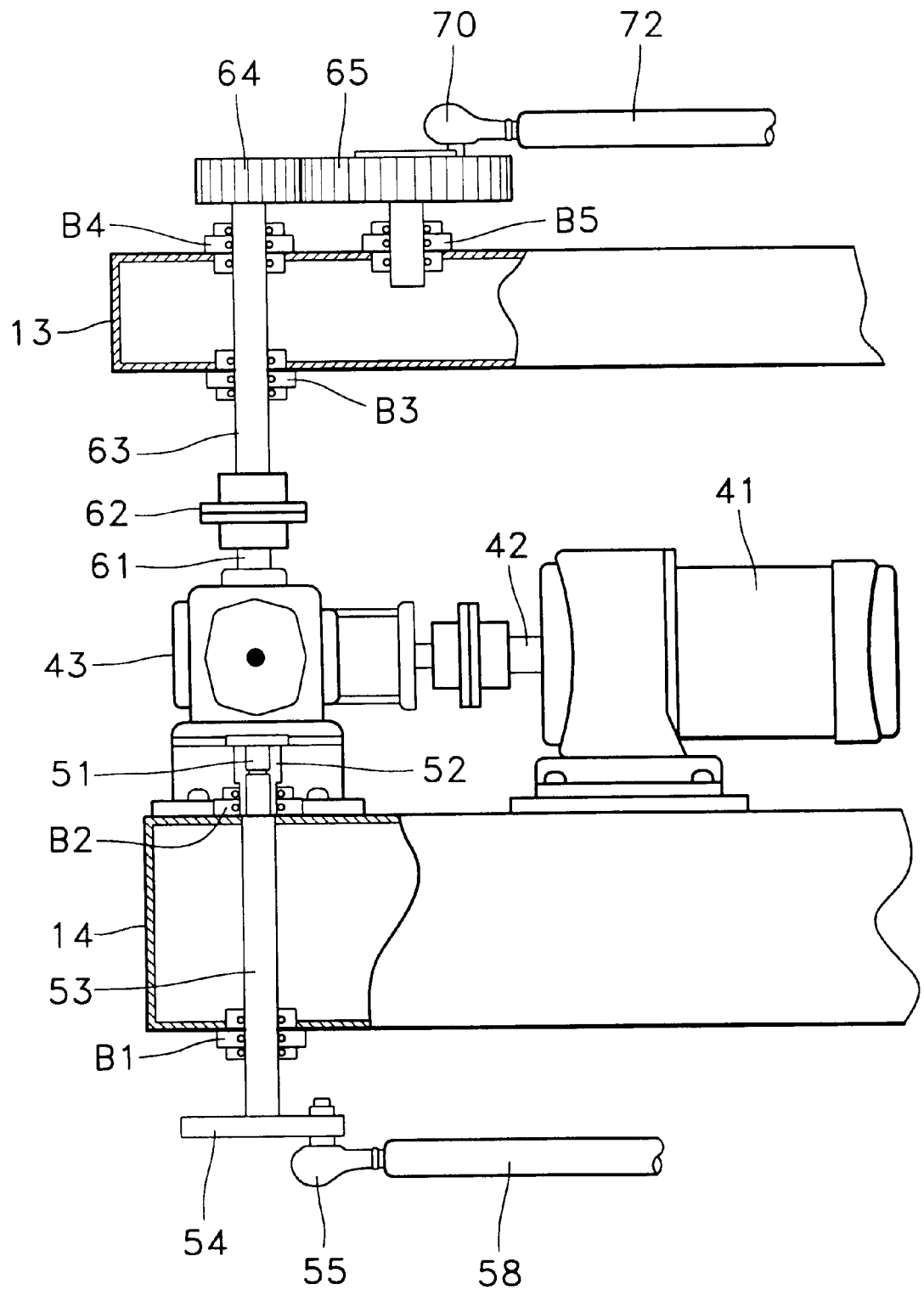
FIG. 3 illustrates a side view of the power generating means for driving the seat test machine according to an embodiment of the present invention.
Figure 4:
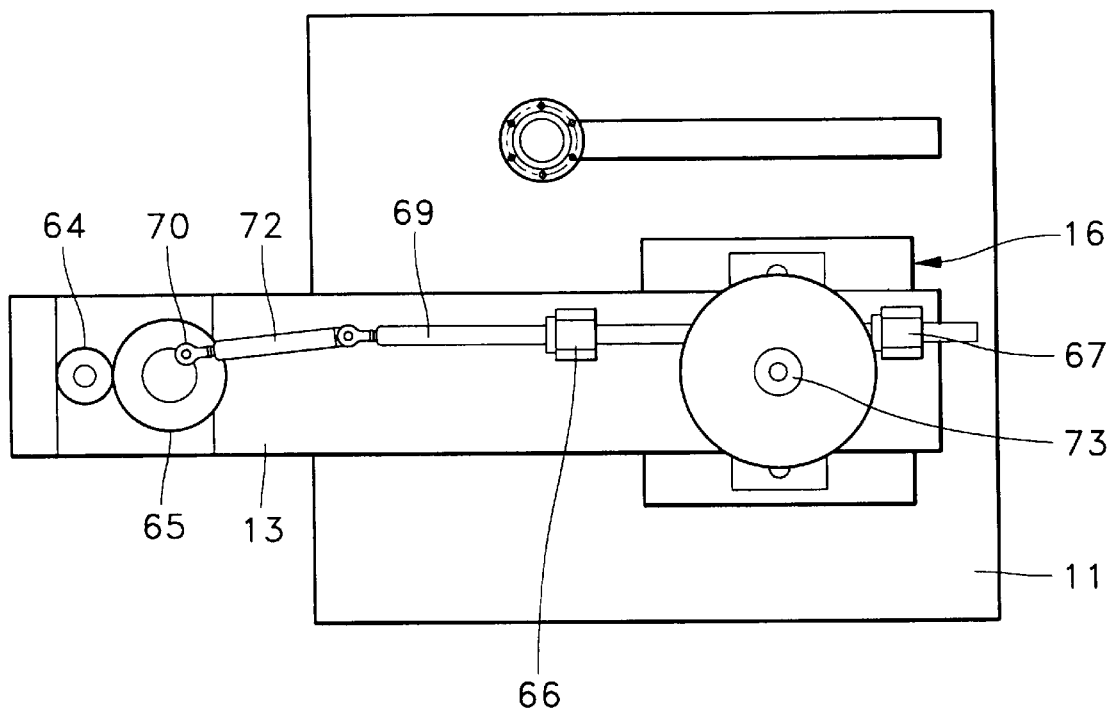
FIG. 4 illustrates a top view according to an embodiment of the present invention.
Figure 5:
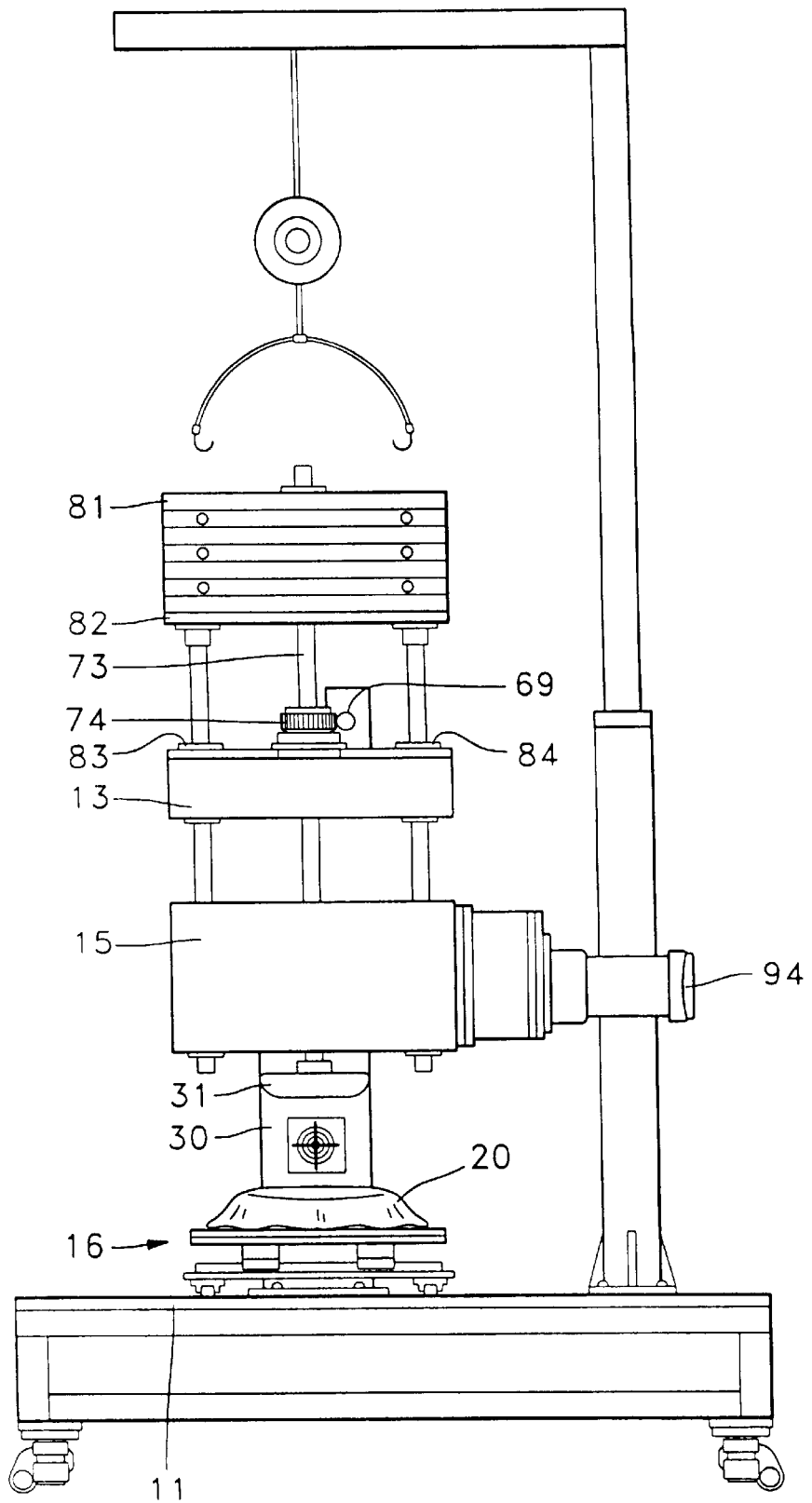
FIG. 5 illustrates a frontal view of the present invention showing a vertical loading mechanism according to an embodiment of the present invention.
Figure 6:
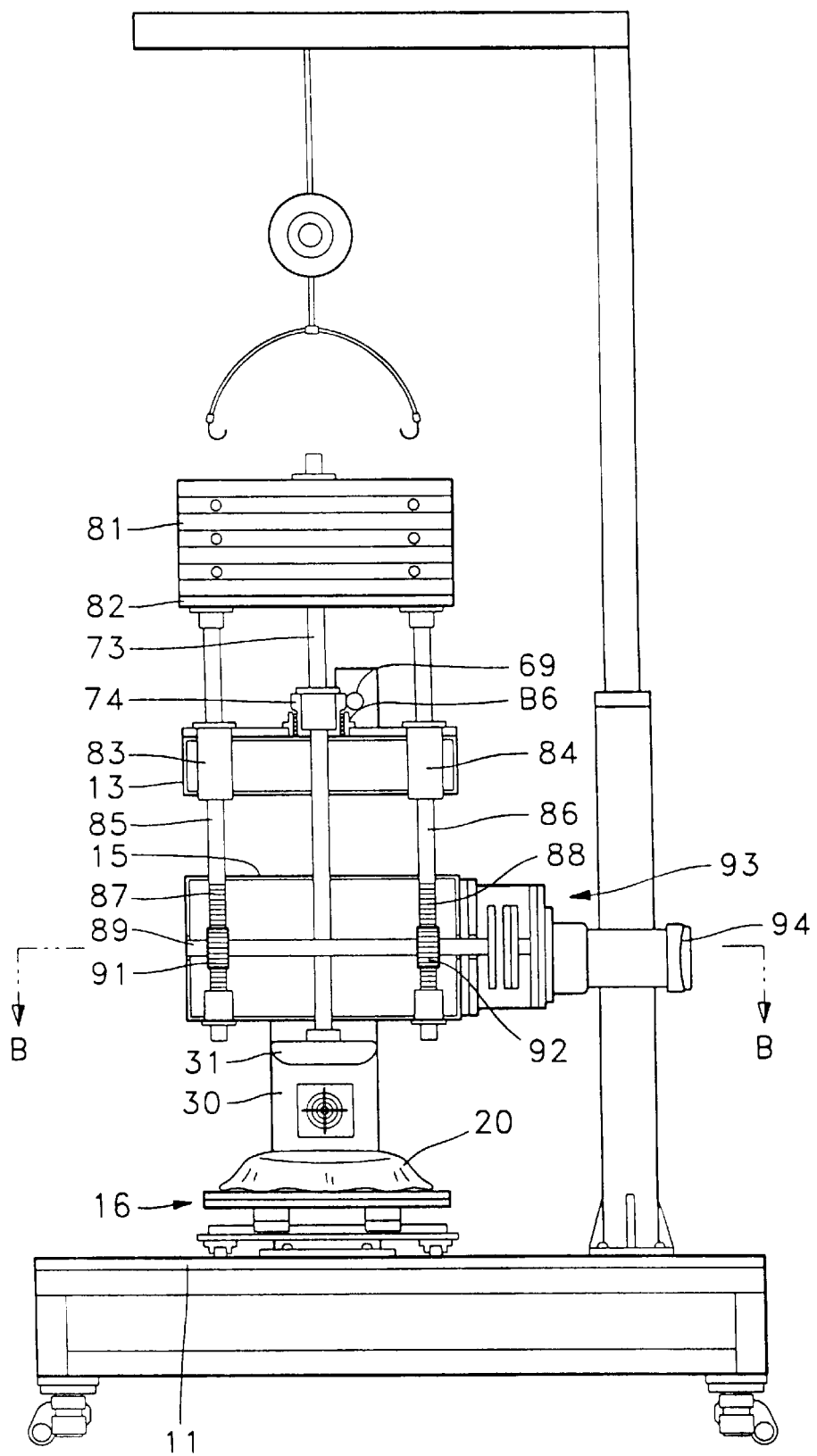
FIG. 6 illustrates a cross-section view of the FIG. 2 in the A—A direction according to an embodiment of the present invention.

The present invention relating to an apparatus for driving a seat test machine includes a housing 10 with a base plate 11; a post 12 mounted at the mid-section of the base plate 11; an upper frame 13 coupled to the upper end of the post 12 along a horizontal direction; a lower frame 14 coupled to one side of the post in a horizontal direction; and, a middle frame 15 coupled to the one side of the post 12 in a horizontal direction and extending away from the lower frame 14.

The present invention further includes a seat element 20 representing a small portion of the exterior texture and its interior portion of polyurethane foam of an actual car seat to be tested.

The seat element is supported by a seat support means 16 for reciprocating along a first axis and a second axis.

Furthermore, the present invention includes a twisting assembly 30 for oscillating about a rotary axis to engage with the surface of the seat element 20; a testing head member 31 coupled to the bottom end of the twisting assembly 30; a first mechanism for reciprocating the seat element 20 along the first axis; a second mechanism for oscillating the testing head member 31 of the twisting assembly 30 about the rotary axis to engage with the surface of the seat element 20; a vertical loading mechanism for repeatedly applying impact engagement loading on the seat element 20 in a substantially vertical direction; and, a power means for activating these first mechanism and second mechanism.

Preferably, the power means includes a plurality of coupling means for transmitting the power generated by a common motor means to the first and second mechanisms.

Referring now more particularly to the specific embodiment mentioned in the above, the present invention includes a first motor 41 mounted to the top portion of the lower frame 14; a first rotating shaft 42 coupled to the first motor 41; a reduction gear 43 coupled to the first motor 41; a third coupling means 40 such as a flange coupling interposed between the first rotating shaft 42 and the reduction gear 43; an upper spindle 61 rotatably coupled to the upper portion of the reduction gear 43; and, a lower spindle, 51 rotatably coupled to the lower portion of the reduction gear 43.

The first mechanism further includes a first coupling means 52 such as a flange coupling coupled to the lower end of the lower spindle 51; a lower axial shaft 53 coupled to the first coupling means 52 at one end and extending through the lower frame 14; a first rotating plate 54 coupled to the bottom of the lower axial shaft 53 in an axial direction; a first crank shaft 58 coupled to the first rotating plate 54 in a radial direction; a lower sliding shaft 56 interposed between a sliding plate 17 and the first crank shaft 58, a first linking member 55 rotatably coupled to the one side of the first rotating plate in a radial direction and coupled to the first crank shaft 58 at the other end; and, a second linking member 57 rotatably coupled to the first crank shaft 58 at one end and coupled to the lower sliding shaft 56 at the other end.

At the bottom portion of the post 12, the lower sliding shaft 56 is rotatably supported by a first guiding member 59 and a second guiding member 59' for providing a linear movement of the lower sliding shaft 56 along the X-direction.

The second mechanism includes a second coupling means 62 such as a coupler to couple to shafts together; an upper axial shaft 63 coupled to the second coupling means 62 and extending through the upper frame 13 in an upward vertical direction; a first rotary gear 64 coupled to one end of the upper axial shaft 63 in an axial direction; a second rotary gear 65 for engaging with the first rotary gear 64; a third linking member 70 rotatably coupled to the upper portion of the second rotary gear 65 in a radial direction; a second crank shaft 72 coupled to the third linking member 70 at one end and rotatably coupled to a fourth linking member 71 at the other end; an upper sliding shaft 69 coupled to the fourth linking member 71 at one end and rotatably supported by a third guiding member 66 and a forth guiding member 67 at the other end for reciprocating the second sliding shaft 69 along the X-direction; and the twisting assembly 30 responsive to the reciprocating movement of the upper sliding shaft 69 for providing a twisting motion.

It should be noted that the number the first rotary gear 64 and the second rotary gear 65 is not restricted only to these two gears.

The specific embodiment for the twisting assembly further includes a twister shaft 73 coupled to a center point of the testing head member 31 in an axial direction at one end and extending through a first pinion 74 at the other end. The upper sliding shaft 69 having a first toothed member 68 provides the twister shaft 73 to oscillate in response to its engagement with the first pinion 74.

The vertical loading mechanism includes a weight plate 82 for supporting a plurality of weights 81 mounted along the upper end of the twister shaft 73; a first gear shaft 85 having a second toothed member 87 and a second gear shaft 86 having a third toothed member 88 coupled to at the bottom of the weight plate 82, and both first gear shaft and second gear shaft extending downward through the upper frame 13, and thereafter, extending through the middle frame 15; a fifth guiding member 83 and a sixth guiding member 84 mounted on the upper frame 15 in the vertical direction for providing the first gear shaft 85 and the second gear shaft 86 to freely move up and down through the stationary upper frame 13; a horizontal shaft 89 located inside of the middle frame 15 and coupled to an electronic clutch 93 at one end; a second motor 94 coupled to the electronic clutch 93; and, a second pinion 91 and a third pinion 92 coupled along the horizontal shaft 89 for engaging with the second toothed member 87 and third toothed member 88, respectively.

Figure 7A:
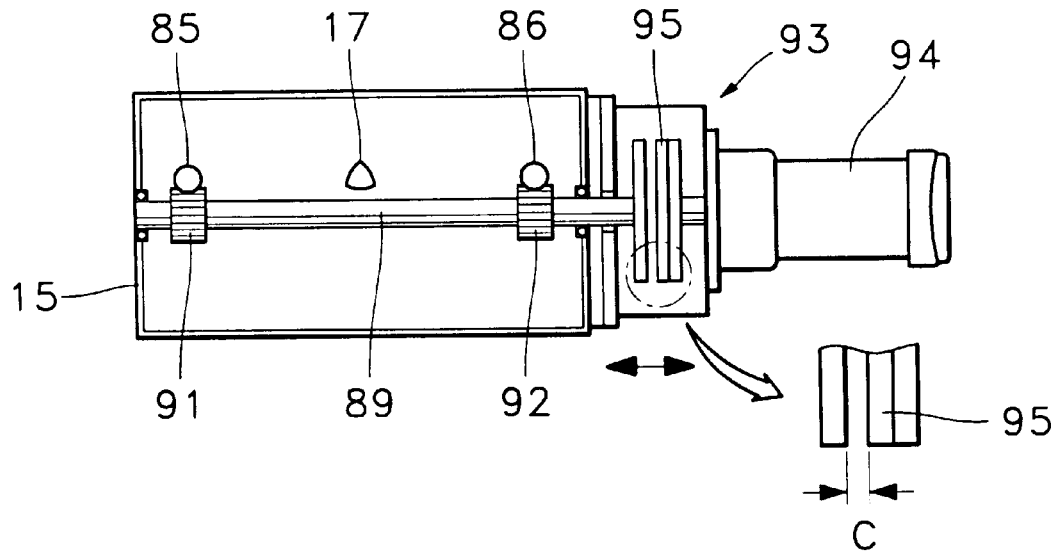
FIG. 7(a) illustrates the electronic clutch in an "OFF" position according to an embodiment of the present invention; and, FIG. 7(b) illustrates the electronic clutch in an "ON" position according to an embodiment of the present invention.
Figure 7B:
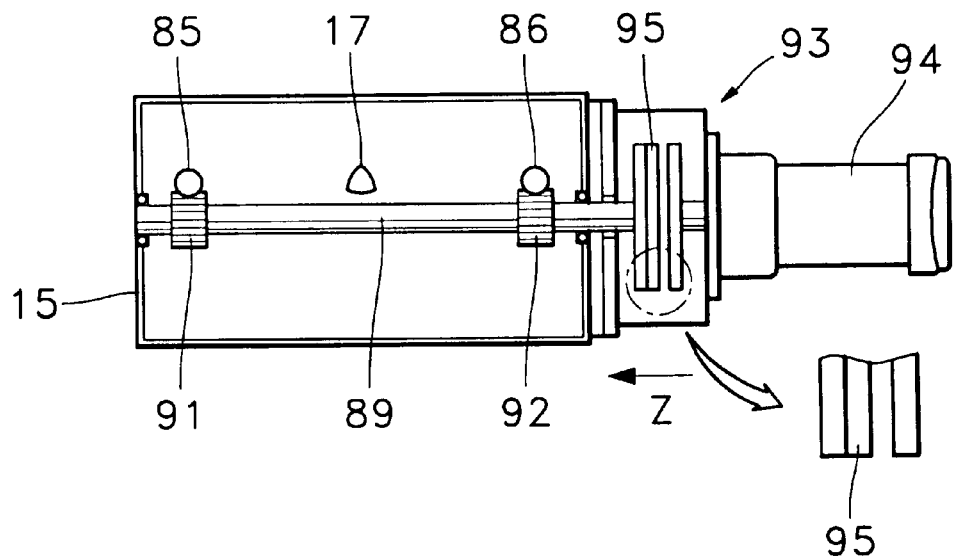
FIG. 7 illustrates a cross-section view of the electronic clutch as shown in the FIG. 6 in the B—B direction according to an embodiment of the present invention.

As illustrated in FIG. 7(*a*) and 7(*b*), a commonly used electronic clutch is used. The electronic clutch 93 for activating the horizontal shaft 88 is powered by the second motor 94, and includes a rubbing plate 95 which is selectively movable depending upon the flow direction of an electric current as illustrated by the arrow in the FIG. 7. It should be noted that a detailed description for the electronic clutch 93 is intentionally omitted since it is believed to be commonly used.

It should be noted that the symbols B1, B2, and through B6, which represent bearings, are illustrated but not explained.

The operation of the preferred embodiment of the present invention is as follow:

First, the seat element 20 is mounted to the seat support means 16, and the testing head member 31 is fixed to the bottom of the twisting assembly 30. Then, an appropriate weight 81 is placed on the weight plate 82.

After setting up as stated above, the seat test machine is activated. Then, the first motor 41 and the second motor 94 activates the seating element 20 to reciprocate in alignment with the seat support means 16 and causes the testing head member 31 of the twisting assembly 30 to oscillate about the rotary axis. At the same time, the twister shaft 73 moves along the rotary axis in a substantially vertical direction and permits the testing head member 31 to engage with the seat element 20, and measures the durability of the composition and elements of the seat element 20. The vertical movement of the twister shaft 73 along the rotary axis functions independently without interfering with the twisting motion of the twister shaft 73.

A detailed explanation of the above operation is described herein. The power generated by the first motor 41 passes through the reduction gear 43, and simultaneously activates the lower spindle 51 and the upper spindle 61 in sequence.

Then, the power conveyed to the lower spindle 51 activates the lower axial shaft 53, the first rotating plate 54, the first crank shaft 58, and the first sliding shaft 56 in sequence, causing the lower sliding shaft 56 to reciprocate along the first axis.

The fore-aft movement of the lower sliding shaft 56 is achieved through a first rotary to linear motion converter, which includes first rotating plate 54 and the first crank shaft 58 coupled to the first rotating plate 54 in a radial direction.

As a result, the sliding plate coupled to the lower sliding shaft 56 causes the seat support means 16 and the seat element 20 mounted thereon to reciprocate along the first axis.

Similarly, the power transmitted to the the upper spindle 61 activates the upper axial shaft 63, the first rotary gear 64, the second rotary gear 65, and the second crank shaft 72 in sequence, causing the upper sliding shaft 69 to reciprocate.

The linear movement of the upper sliding shaft 69 is accomplished by a second rotary to linear motion converter which includes the second crank shaft 72 being coupled to the second rotary gear 65 in a radial direction, the third guiding member 66, and the forth guiding member 67.

During the movement of the upper sliding shaft 69, the first toothed member 68 of the upper sliding shaft 69 engages the first pinion 74 causing the twister shaft 73 and the first pinion 74 to oscillate. The movement of the twister shaft 73 causes the twisting assembly 30 and the testing head member 31 to engage with the seat element 20 on seat support means 16 in a prescribed direction of rotation.

At this point, when the twisting shaft 73 moves in a downward direction and the twisting assembly 30 and the testing head member 31 comes in contact with the seat element 20, the electronic clutch 93 is not activated, and the rubbing plate 95 is in position with the gap (indicated as "C") as illustrated in FIG. 7(*a*). Consequently, the power generated by the second motor 94 is not transmitted to the horizontal shaft 89.

The electronic clutch 93 is activated upon an impact of a load that simulates the occupant. Upon such impact, the electronic clutch 91 receives an electronic signal and the rubbing plate 95 moves in a Z-direction as illustrated in FIG. 7(*b*), and causes the horizontal shaft 89 to rotate inside of the middle frame 15.

When the clutch 91 is being activated, the second pinion 91 and the third pinion 92 engage with the second toothed member 87 and third toothed member 88, respectively, which in turn activate the first gear shaft 85 and the second gear shaft 86 to move in an upward direction. This upward movement of the first gear shaft 85 and the second gear shaft 86 causes the twister shaft 73 and multiple weights 81 mounted to the weight plate 82 to elevate in the same upward direction.

After the twister shaft 73 elevates to the highest point, a monitoring device detects the final position of the weight plate 82, not illustrated in the drawing, signals a controller which in turn signals the electronic clutch 93 to shut off.

Consequently, the first gear shaft 85 and the second gear shaft 86 descend downward freely without any opposing force from the horizontal shaft 89, the second pinion 91, and the third pinion 92 mounted thereon.

Accordingly, the second motor 94 ceases to rotate the horizontal shaft 89 and causes the gravitational force induced by the multiple weight 81 mounted to the weight plate 82 to move the twister shaft 73 in a downward direction for providing an impact engagement with the seat element 20. Furthermore, the twisting motion of the twisting assembly 30 and the testing head member 31 provide rubbing engagement with the seat element 20. Testing the composition of the seat element 20 is achieved accordingly with these repeated impact and rubbing engagements.

The movement frequency of the twister shaft 73 using a controller for the electronic clutch 93 can be controlled.

Preferably, the distance to cover the seat element 20 in the first direction should be approximately 150 mm±5 mm and the variable speed to cover the seat element 20 should be about eleven to twenty two times per minute. The twisting angle of the testing head member 31 should be about 15°±1°, 22.5°±1°, 30°±1°, and the variable speed should be about five and a half to eleven times per minute. A manual or an automatic switch can activate the first motor 41.

The first motor 41 is made of three-phase altering-current motors which include a synchronous motor and an induction motor whose speed is determined by the line of frequency fed by an inverter and further includes a converter to process the alternating current power into direct-current(dc) power.

The variable speed of the first motor 41 can be displayed digitally by a speedometer Although various preferred embodiments of the present invention have been described in detail in the above, it should be understood that many variation and/or modifications of the basic inventive concepts herein taught which may appear to those skilled in the art will still fall within the spirit and scope of the present invention as defined in the appended claims.

We claim:

1. An apparatus for testing durability of a car seat element, comprising:
   a housing have a base plate supportable in a substantially horizontal orientation;
   a support means disposed on said base plate for supporting a seat element to be tested;
   a twisting assembly having a testing head member; said twisting assembly being displaceable for selectively engaging at least a portion of the surface of said seat element between said testing head member and said support means;
   a first mechanism operable to reciprocate said support means along a first axis substantially parallel to said base plate;
   a second mechanism operable to oscillate said testing head member of said twisting assembly about a rotary axis, said rotary axis being disposed substantially perpendicular to said base plate;
   a vertical loading mechanism selectively operable to displace said twisting assembly linearly along said rotary axis in a substantially vertical direction so that said testing head member engages said seat element on said support means;
   a lifting mechanism selectively operable to displace said twisting assembly along said rotary axis in a substantially vertical direction so that said testing head member is brought out of engagement with said seat element on said support means;
   a first motor means for operating said first mechanism and said second mechanism;
   a second motor means for actuable for operating said lifting mechanism; and,
   control means for selectively engaging said first motor means with first mechanism and said second mechanism for operation thereof.

2. An apparatus as described in claim 1, wherein said controlling means further includes
   a first coupling means interposed between said first motor means and said first mechanism for transmitting power from said first motor to said first mechanism, and
   a second coupling means interposed between said first motor means and said second mechanism for transmitting power from said first motor to said second mechanism.

3. An apparatus as described in claim 1, wherein said support means further includes
   a sliding plate driven by said first mechanism.

4. An apparatus as described in claim 1, wherein said first mechanism further includes
   a first rotary to linear motion converter coupled to said sliding plate.

5. An apparatus as described in claim 1, wherein said second mechanism further includes
   a second rotary to linear motion converter coupled to said twisting assembly.

6. The apparatus as described in claim 5, where in said twisting assembly further includes
   a twister shaft coupled to center portion of said testing head member and being disposed along said rotary axis so that said twisting shaft responds to said second rotary to linear motion converter.

7. An apparatus as described in claim 1, wherein said vertical loading mechanism further includes
   a plurality of sliding shafts, said sliding shafts upper free ends being the opposite end of said sliding shafts remote from said testing head member are accessible for engagement with a plurality of weight members to provide a gravitational loading.

8. An apparatus as described in claim 7, wherein said lifting mechanism further includes
   a selectively operable clutch for engaging and disengaging said vertical loading mechanism so that said testing head member engages and disengages said seat element on said support means, and
   a horizontal shaft coupled to said clutch and selectively disengagable from said sliding shafts to permit said vertical loading mechanism to displace said testing head member into a vertical impact engagement with said seat element on said support means under the force of gravity.

* * * * *